United States Patent [19]

Saracco

[11] 4,185,857
[45] Jan. 29, 1980

[54] PIPE COUPLING COMPENSATING DEVICE

[75] Inventor: Raymond F. Saracco, West Mifflin, Pa.

[73] Assignee: Koppers Company, Inc., Pittsburgh, Pa.

[21] Appl. No.: 914,850

[22] Filed: Jun. 12, 1978

[51] Int. Cl.$^2$ .............................................. F16L 17/06
[52] U.S. Cl. ..................................... 285/363; 285/416; 285/DIG. 11; 285/187
[58] Field of Search ............... 285/223, 224, 363, 368, 285/405, 416, 419, DIG. 11, 187; 403/337, DIG. 9

[56] References Cited

U.S. PATENT DOCUMENTS

| 3,065,000 | 11/1962 | Stanton | 285/368 X |
| 3,727,955 | 4/1973 | Carter | 285/223 |

FOREIGN PATENT DOCUMENTS

| 375777 | 10/1939 | Italy | 285/223 |
| 725009 | 3/1955 | United Kingdom | 285/363 |

Primary Examiner—Dave W. Arola
Attorney, Agent, or Firm—R. Lawrence Sahr

[57] ABSTRACT

A pipe coupling device to relieve stresses within coupled pipe derived as a result of generally transverse motion of the coupled pipes relative to one another. The device sealably couples piping while compensating for generally transverse motion of piping relative to each other without adversely affecting the integrity of the seal.

1 Claim, 5 Drawing Figures

PIPE COUPLING COMPENSATING DEVICE

BACKGROUND OF THE INVENTION

This invention relates to pipe coupling devices.

There are many different types of pipe coupling devices. The most suitable type of pipe coupling device for use in a particular system is dependent upon parameters of the system.

Pipeline charging systems which deliver coal to a coke oven present parameters that are severe. The coking process requires the pipeline charging system to transport crushed coal to the coke oven using superheated steam as the transport medium. The single pipe which customarily connects the coke oven to the coal crushing and steam induction unit (hereinafter referred to as feeder unit) is subject to stress which causes the pipe to buckle. The presence of superheated steam and crushed coal within the pipe causes coal tars to be secreted from the coal in the pipe. The coal tar tends to congregate in the buckled portion of the pipe, blocking or severely inhibiting flow through the pipe. Buckling of the pipe is caused by thermal expansion of the coke oven which achieves a much greater temperature than the pipe. The pipe is customarily fixably mounted to the roof of a coke oven and to the feeder unit. As the coke oven roof displaces vertically due to coke oven thermal expansion, the pipe is subjected to stress due to the lack of comparable expansion or motion of the feeder unit; the stress causing the pipe to buckle. A piping coupler able to compensate for the vertical expansion of the coke oven would be advantageous to the system; however, the extreme heat predicted by the follow of superheated steam through the pipe forcloses the deployment of conventional couplers.

The present invention would provide a pipe coupling arrangement which would allow the sealable coupling of pipes while compensating for generally transverse motion of the coupled pipes relative to each other. The invention can be employed to sealably couple pipes, notwithstanding, the passage of a relatively high temperature substance therethrough.

DETAILED DESCRIPTION OF THE PREFERRED EMBODIMENT

Figure 1:
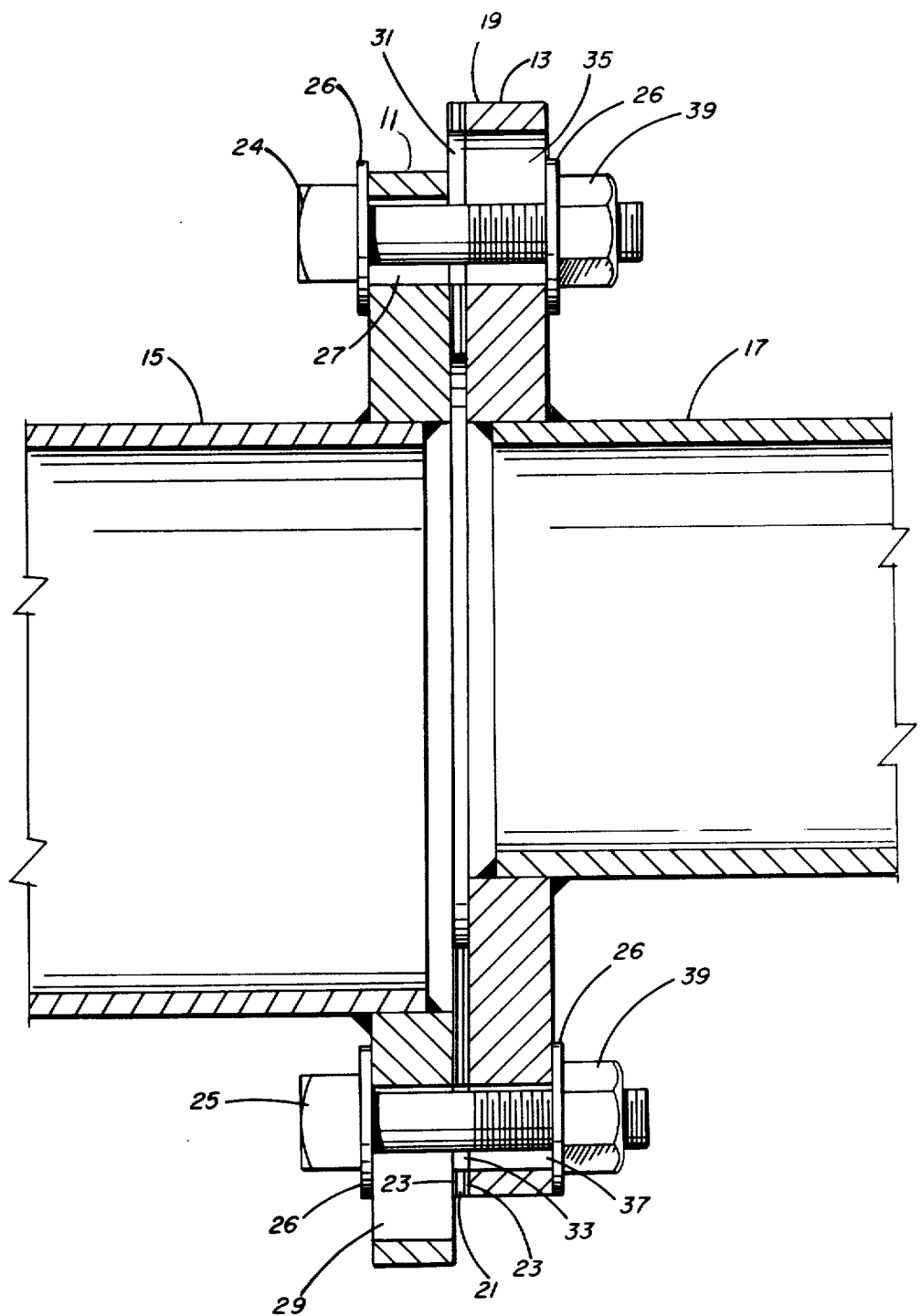
FIG. 1 is a side sectional view of coupled pipes employing the compensation device in a normal position.

Referring to FIG. 1, the pipe coupling device, generally indicated as 10, includes a first flange 11 and second flange 13 suitably mounted by conventional means such as welding to pipe sections 15 and 17, respectively. An apertured sealing ring 19 is also employed. The aperture sealing ring 19 is comprised of an asbestos ring 21 sandwiched between stainless steel rings 23 which enables the sealing ring 19 to withstand relatively high temperatures. Bolts 24 and 25 secure the first flange 11, second flange 13 and sealing ring 19 to one another, thereby sealably coupling pipes 15 and 17 to one another. The first flange 11 has a series of apertures 27 and 29, and the second flange 13 has apertures 35 and 37. The sealing ring 19 also has apertures 31 and 33. Apertures 27 of first flange 11, 31 of sealing ring 19, and 35 of second flange 13 are aligned such that bolts 24 can pass therethrough, being secured by hex nuts 39. Apertures 29 of first flange 11, 33 of sealing ring 19, and 37 of second flange 13 are aligned such that bolts 25 can pass therethrough, being secured by hex nuts 39. A washer 26 is placed between bolts 24 and 25 and flange 11 and between hex nuts 39 and flange 13.

It will be noted from FIG. 1 that in the preferred embodiment pipe 15 has a greater diameter than pipe 17. Assuming the flow of any enclosed material to be in the direction indicated, the difference between the diameter of pipe 15 and 17 is at least equal to the expected amount of relative transverse motion to be preceded.

Figure 2:
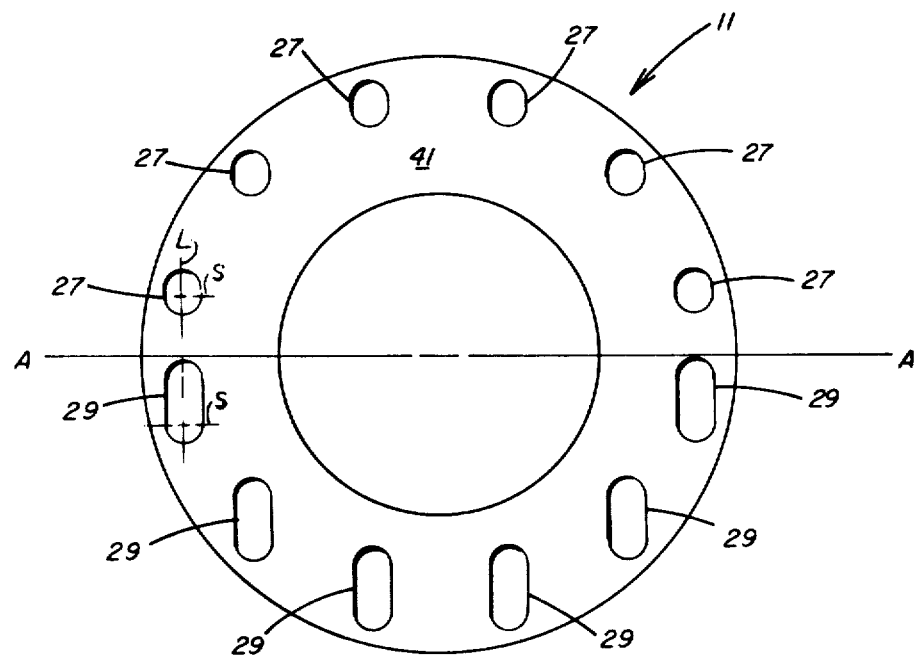
FIG. 2 is an elevated view of a first compensating flange.

Compensation for relative transverse motion of pipes 15 and 17 is facilitated by the configuration of the plurality of apertures 27, 29, 35, 37, 31, 33 in flanges 11 and 13 and sealing ring 19. Referring to FIG. 2, first flange 11 has a plurality of apertures 27 and 29 which are generally eliptical in shape. The apertures 27 and 29 are vertically oriented, as shown in FIG. 2, with a major axis L of greater length than minor axis S. Minor axis S is sufficient to allow passage of bolts 24 and 25 therethrough. As illustrated herein, the apertures 27, which are above the horizontal line A—A, have a major axis L to permit a minimum amount of movement of bolt 24 therein. The apertures 29 of flange 11 below the horizontal line A—A are vertically elongated in that the major axis L approximately equals the magnitude of amount of relative motion expected to be perceived between pipes 15 and 17.

Figure 3:
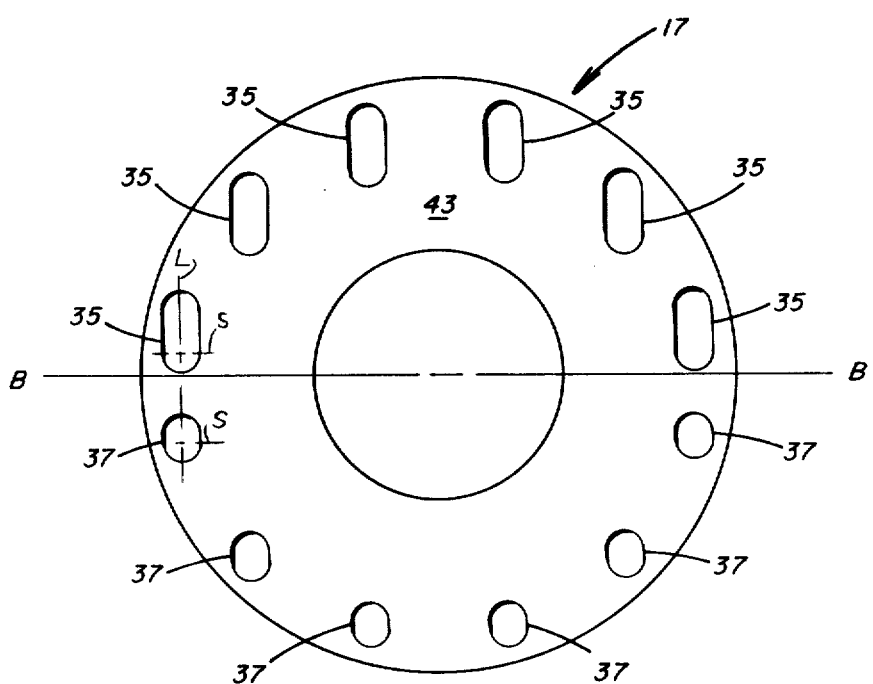
FIG. 3 is an elevated view of a second compensating flange.
Figure 4:
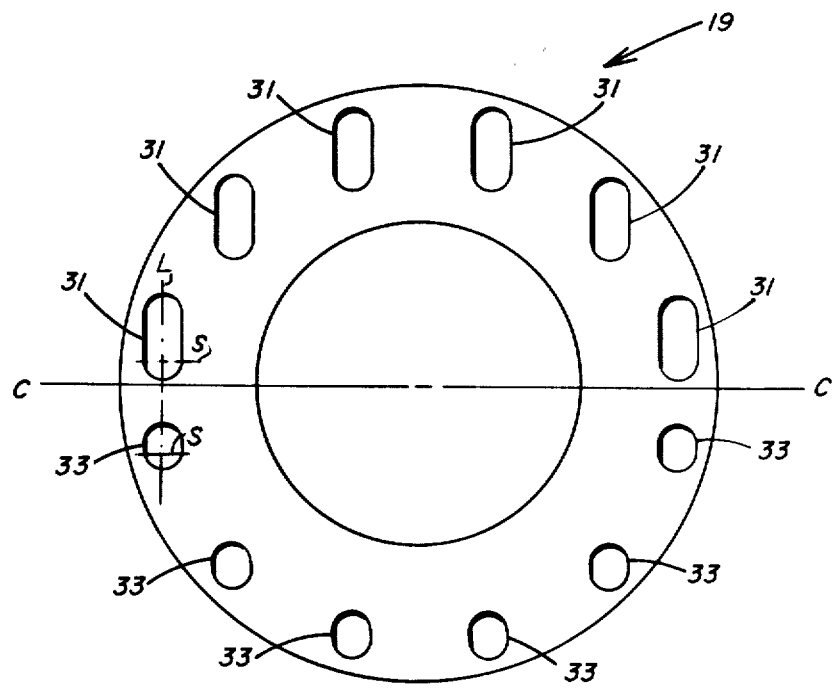
FIG. 4 is an elevated view of a sealing ring.

Referring to FIG. 3, flange 13 has a plurality of apertures 35 located above the horizontal line B—B. Apertures 35 of flange 13 are identical to apertures 29 to first flange 11. Below line B—B, on face 43 of flange 13, are a plurality of apertures 37 which are identical to the apertures 27 of first flange 11. Referring to FIG. 4, sealing ring 19 has a plurality of apertures 31 above line C—C which are identical to apertures 29 of first flange 11. Below line C—C, on the sealing ring 19, are a second plurality of apertures 33 identical to apertures 27 of first flange 11.

The alignment of flange 11, sealing ring 19, and flange 13 to each other is such that the sealing ring 19 is placed between flanges 11 and 13, and the apertures 27 of flanges 11 are linearly aligned to apertures 31 of sealing ring 19 and to apertures 35 of flange 13. Apertures 29, 37 and 33 of respective members flange 11, flange 13, and sealing ring 19 are also linearly aligned to one another. The major axis of apertures 29 or 35 or 31 is directed generally transversely to the pipes 15 and 17 in the direction for which motion is expected.

FIG. 4 shows the pipes 15 and 17, and affixed flanges 11 and 13, transversely displaced with respect to one another, in relation to an original positioning shown in FIG. 1. It is observed from FIGS. 1 and 4 that bolts 24 and 25, in conjunction with nuts 39, maintain flanges 11 and 13 in parallel orientation to one another. However, due to the aforedescribed aperture deployment in flanges 11 and 13, bolts 24 and 25 will permit a certain degree of relative parallel motion between flanges 11 and 13.

Although certain materials and processes have been described for use in fabricating the various embodiment of the invention, it should be clear that the materials and processes utilized are not critical and any material and process generally considered to be suitable for the particular element or function may be substituted for those specified herein. In addition, although only one embodiment is shown of the invention in detail, it should be understood that modifications and other embodiments of the invention may be made using the teaching of this invention.

Figure 5:
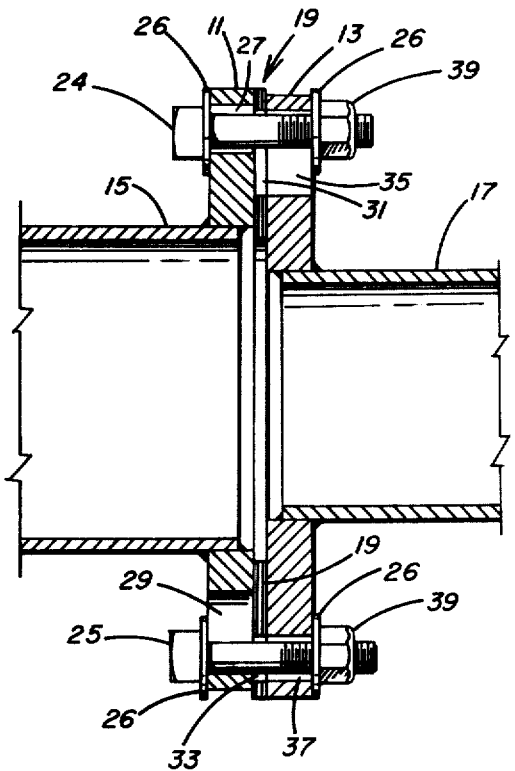
FIG. 5 is a side sectional view of a coupled piping employing the compensating device in alternative position.

Accordingly, it is intended that the foregoing disclosure and showing in the drawing may be considered only as illustrative of the principle of the present invention. Additionally, FIGS. 1 and 5 show the flanges 11 and 13 as perpendicular to the pipe sections 15 and 17 which need not be the case. The advantages of the present invention are obtainable irrespective of the relative orientation of pipe sections 15 and 17 to one another, provided the relative motion between pipe sections 15 and 17 is directed parallel to affixed flanges 11 and 13.

I claim:

1. A combination to sealably couple pipes and, also, compensate for any relative generally transverse motion between said coupled pipes, which comprise:
   a. a first flange adapted to be fixably mounted around said end of one pipe;
   b. a second flange adapted to be fixably mounted around said end of another pipe;
   c. sealing means for fitting between said flanges; and
   d. coupling means, for holding said first and second flanges in parallel axial orientation to one another with said sealing means therebetween, said coupling means to allow said flanges to slidably move parallel to one another and generally transverse to the general axial orientation of said pipes, said coupling means including:
      1. a plurality of apertures, generally eliptically shaped having a major and minor axis, placed in said first and second flanges, wherein the eliptically shaped apertures of one half of each of said flanges has a major axis larger than the major axis of the eliptically shaped apertures of the remaining half of said flange;
      2. a plurality of bolts passing through said apertures so as to hold said flanges together so that the half of said first flange with the larger major axis is in registry with the half of said second flange which has the shorter major axis; and
      3. a plurality of nuts for said bolts.

* * * * *